United States Patent [19]

Banko

[11] Patent Number: 4,747,135
[45] Date of Patent: May 24, 1988

[54] POP UP TELEPHONE

[75] Inventor: Ronald C. Banko, North Wales, Pa.

[73] Assignee: Ron Banko Design, Inc., North Wales, Pa.

[21] Appl. No.: 664,271

[22] Filed: Oct. 24, 1984

[51] Int. Cl.⁴ .......................... H04R 1/02; H04R 1/06
[52] U.S. Cl. ................................. 379/436; 379/427; 379/428; 379/434; 379/440; 379/455; 379/457; 379/445
[58] Field of Search ............... 379/432, 433, 434, 436, 379/440, 457, 454, 455, 428, 427, 445; 179/100 D, 100 R, 100 C, 101, 102, 103, 158 R, 178, 179; D14/53, 63, 65, 66

[56] References Cited

U.S. PATENT DOCUMENTS

| D. 277,481 | 2/1985 | Gallant et al. | D14/65 |
| 2,163,006 | 6/1939 | Oberfell | 379/437 |
| 4,117,276 | 9/1978 | Zurawski | 379/437 |
| 4,169,218 | 9/1979 | Tyler | 379/434 |
| 4,476,354 | 10/1984 | Uchino et al. | 379/445 |
| 4,609,790 | 9/1986 | Kaiwa et al. | 379/445 |

Primary Examiner—Jin F. Ng
Assistant Examiner—Danita R. Byrd
Attorney, Agent, or Firm—Seidel, Gonda, Goldhammer & Abbott

[57] ABSTRACT

A pop up telephone having a latch carried on a latch carrier with a slot. A cap having a post, the post capable of vertical travel within the slot. The post capable of engagement with the latch. A spring, contained below the cap and within the latch carrier is for moving the cap in a vertical direction. The body is for housing the latch carrier, the cap and hand set. The hand set resting on the cap and residing flush within the body. The hand set capable of popping out of the body after being pressed downward.

7 Claims, 2 Drawing Sheets

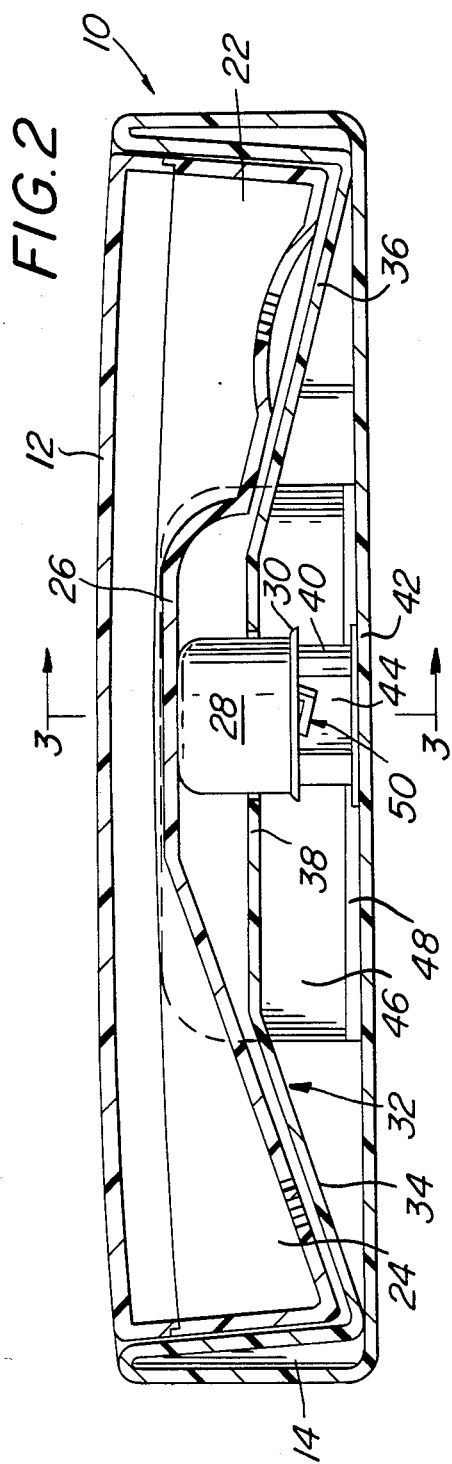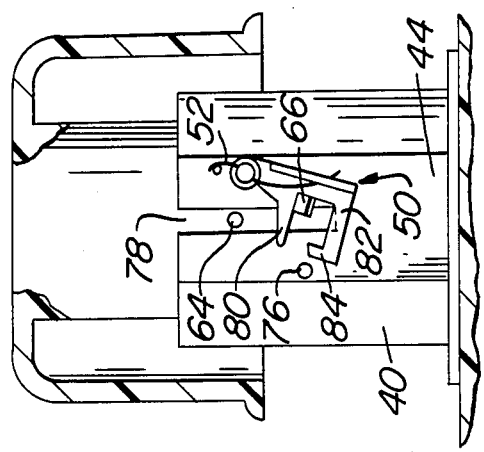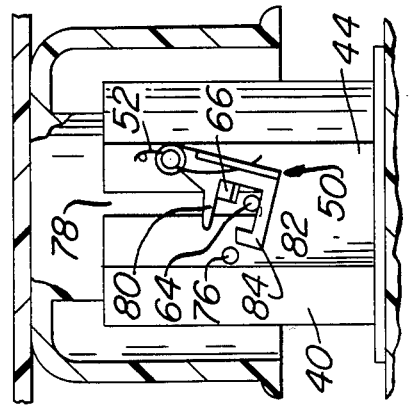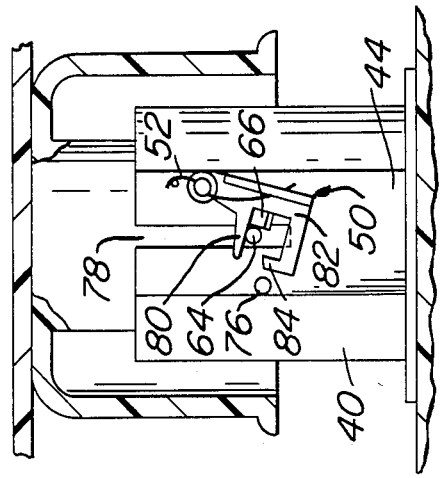

POP UP TELEPHONE

BACKGROUND OF THE INVENTION

This invention is related to a telephone. Particularly, this telephone has a handset which is flush within the body of the telephone. The handset, when pressed down, pops out of the body of the telephone and may be retrieved from the body of the telephone.

Prior art telephones, generally, have a handset which rests upon the body of the telephone. The handset is exposed to view. This configuration makes it difficult to conceal the identity of the telephone.

Prior art telephones, because of their configuration, are difficult to conceal. The need to conceal the telephone is important when decorating a room. A telephone may detract from the appearance of a room setting. Some rooms, such as a bedroom, a living room, a dining room or a reception area, look better when no telephone is visible. This is because such rooms traditionally have gone without telephones.

SUMMARY OF THE INVENTION

The present invention is a telephone including a latch which is carried on a latch carrier having a slot, and a cap with a post disposed on a portion of the cap, the post being adapted to travel in the slot of the latch carrier. A spring is contained within the cap and is in communication with the cap and the latch carrier. A body of the phone contains the latch carrier and the cap. A handset rests upon the cap and within the body of the telehone.

The handset, when resting upon the cap, is flush within the body of the telephone. The handset is concealed from view. The handset and body do not give the appearance of a traditional telephone. The present invention has the appearance of a decorative ornament.

An object of this invention is to conceal the handset within the body of the telephone.

A further object of this invention is to provide a telephone which is viewed as an ornamental object.

A still further object of this invention is to provide a latching mechanism which after the handset is pressed down, the handset will pop from the body of the telephone.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is a longitudinal sectional view of the telephone taken along lines 2—2 of FIG. 1.

FIGS. 4–6 are schematic representations of the latching mechanism in operation.

DETAILED DESCRIPTION OF THE INVENTION

Figure 1:
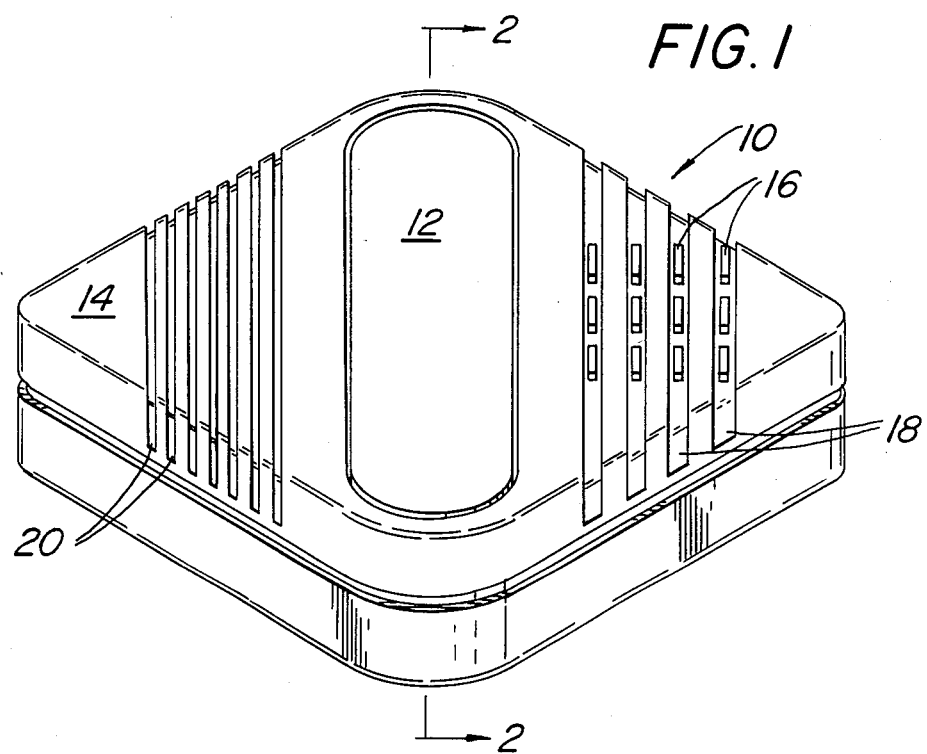
FIG. 1 is an isometric view of the pop up telephone with the handset flush in the body of the telephone.

Referring to the drawings, wherein like numerals indicate like elements, there is shown in FIG. 1 a pop up telephone 10. The telephone 10 is generally a rectangular or diamond shape and having rounded corners. The telephone 10 has a handset 12 and a body 14. The handset 12 is resting flush within the body 14. Buttons 16 are located in button grooves 18. The buttons 16 and button grooves 18 are disposed on the body portion 14 of the telephone 10. Grooves 20 are located on the side opposite the handset 12 of the buttons 16. The buttons 16 are used for dialing the telephone 10. The grooves 18 and 20 enhance the appearance of the telephone 10.

In FIG. 2, there is shown a longitudinal sectional view of the telephone 10. The handset 12 is shown flush with the body 14. The handset 12 has a listening end 22 and a sender end 24. The ends 22 and 24 function the same as like parts of a conventional handset. A resting plate 26 is located between the listening end 22 and the sender end 24 on the handset 12. The handset 12 rests on a cap 28. The cap 28 is in face contact with the resting plate 26. The cap 28 supports the handset 12 within the body 14.

The body 14 has a recess 32. The recess 32 is generally defined by the shape of handset 12, and includes a sender end surface 34, a listening end surface 36 and a cap restrainer plate 38. The surfaces 32, 34 and 36 correspond to ends 24 and 22 and plate 26 of the handset 12. The cap restrainer plate 38 is located between the sender end surface 34 and the listening end surface 36. When the handset 12 is resting flush within the body 14, there is a gap between the handset 12 and the recess 32. The gap is provided to allow the handset 12 to move vertically within the recess 32.

The cap 28 is generally cylindrical in shape, but is not limited to that shape, and has a closed end. The closed end may be in face contact with the resting plate 26. A lip 30 is peripherally disposed around the lower, open end of the cap 28. The cap 28 slides vertically within a hole in the cap restraining plate 38. The upward movement of the cap 28 is limited by the engagement of lip 30 with the cap restraining plate 38. The restraining action of lip 30 and cap restraining plate 38 prevent the cap 28 from becoming dislodged from the body 14. The downward movement of cap 28 is limited by a latch carrier 40. The latch carrier 40 is located below and within the cap 28. The latch carrier 40 is generally cylindrical, but is not limited to that shape. The diameter of carrier 40 is less than the diameter of cap 28. The latch carrier 40 guides the vertical movement of cap 28. The latch carrier 40 has a latch carrier base 42 which is attached below the latch carrier 40. The latch carrier base 42 is attached to the body 14.

The latch carrier 40 has a latch carrier surface flat 44. The latch carrier surface flat 44 defines a chord across the latch carrier 40. A latch 50 is disposed upon the latch carrier surface flat 44. An elevator plate 46 is disposed on an elevator base 48. The base 48 is attached to the body portion 14. A second elevator plate 46 and base 48 are not shown in FIG. 2. The elevator plates 46 and bases 48 are disposed on either side of latch carrier 40. The elevator plates 46 are parallel to the length of the handset 12. The uppermost end of elevator plates 46 are for placement in handset elevator slots 74. The elevator plates 46 and slots 74 align the handset 12 within the recess 32 of body 14. The elevator plates 46, bases 48 and slots 74 are optional.

Figure 3:
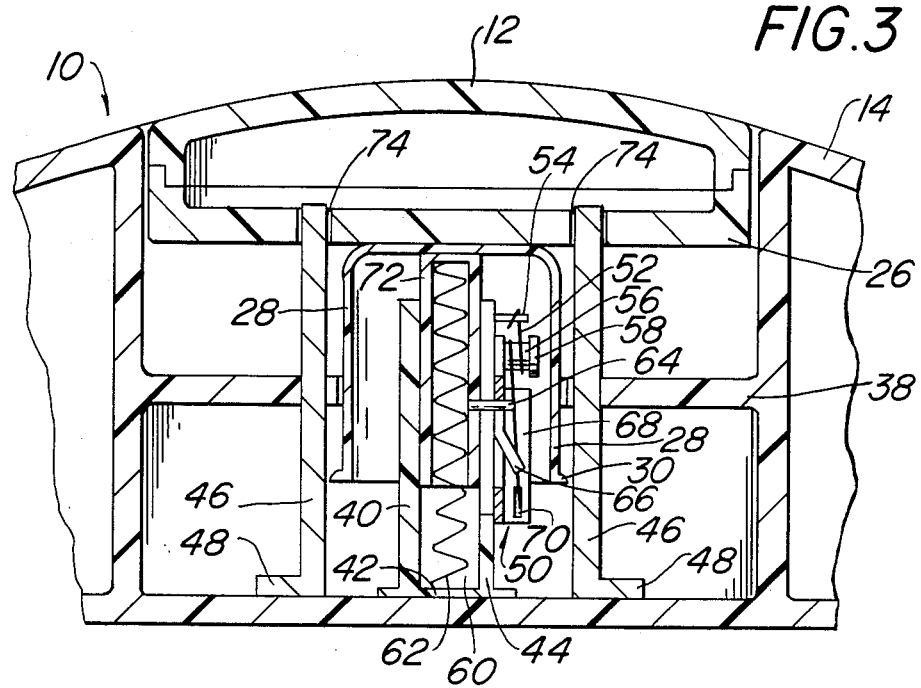
FIG. 3 is a traverse sectional view of the telephone taken along lines 3—3 of FIG. 2.

Referring to FIG. 3, there is shown a traverse sectional view of the telephone 10. Elevator plate slots 74 are disposed on the lower side of handset 12. The elevator plate slots 74 are shown with the elevator plates 46 in place.

The handset 12 is flush within the body 14. The resting plate 26 is in face contact with cap 28. Cap 28 is between elevator plates 46. Cap 28 is disposed through a hole in the cap restraining plate 38. Cap 28 may travel vertically within the hole of cap restraining plate 38.

A cap pop up spring housing 72 is affixed to the closed end of cap 28. The housing 72 has an open end opposite the end affixed to the cap 28. The housing 72 may be cylindrical, but is not limited to that shape. The housing 72 travels vertically within a pop up spring slot 60. Slot 60 defines an inner portion of the latch carrier 40. The slot 60 may be cylindrical, but is not limited to that shape. The outer diameter of housing 72 is less than the diameter of slot 60. The housing 72 may travel freely within the slot 60. The housing 72 has a latch post 64. Latch post 64 is disposed horizontally on a side of the housing 72 corresponding to the carrier surface flat 44. The post 64 is engagable with the latch 50.

A pop up spring 62 is disposed within the slot 60 and the inner portion of housing 72. The spring 62 is affixed at one end to the top of housing 72 and the other end to the base 42. The spring 62 provides the force to pop the cap 28 up when the latch 50 is released. The spring 60 has sufficient strength to drive the handset 12 out of the body 14.

A spring dowel 56 extends horizontally out from and is affixed to the carrier surface flat 44. A dowel cap 58 is disposed at the end of the dowel 56 away from the carrier surface flat 44. The latch 50 depends from the dowel 56. The latch 50 is capable of moving angularly around the dowel 56. The latch 50 is also capable of moving axially along the dowel 56.

A spring hitch post 54 is located above the dowel 56. The post 54 extends horizontally out from the carrier surface flat 44. The post 54 is affixed to the carrier flat 44. A wire spring 52 is anchored on the post 54.

The spring 52 loops around the dowel 56. The spring 52 is placed between the latch 50 and a dowel cap 56. The wire spring 52 is in contact with both the latch 50 and the dowel cap 58. The spring 52 impedes the axial movement of the latch 50.

The latch 50 has a latch wall 68. The latch wall 68 is an integral portion of the latch 50. The wall 68 is disposed upon the latch 50 perpendicular to the flat 44. The wall 68 has a latch wall slot 70. The slot 70 is placed at the end of the wall 68 away from the dowel 56. The spring 52 is placed through the slot 70 and is anchored there. The spring 52 is provided to assist the latch 50 move in a angular direction. The spring 52 would urge the latch 50 to move out of the page as shown in FIG. 3. The angular movement of the latch 50 is stopped by a stop post 76.

The latch 50 has a latch bend 66. The bend 66 is angled away from the flat 44. The angle of the bend 66 is sufficient so that post 64 may travel under the bend 66.

In FIG. 4, there is shown a side view of the latch 50. The latch 50 has a tongue 80. The tongue 80 is perpendicular to the latch wall 68 and parallel to the flat 44. The tongue 80 has an inclined surface on the side facing the dowel 56. The incline of tongue 80 is sloped towards the wall 68. The incline of tongue 80 provides a surface on which the post 64 may ride. The post 64, when engaging the incline of tongue 80, drives the latch 50 away from the latch stop 76. The post 64 will then pass the tongue 80 and engage the underside of tongue 80. The latch 50 then is locked so that the handset 12 is flush in the body 14. The bend 66 is located at the innermost end of the tongue 80 on the side opposite the tongue 80 of the inclined surface. A latch finger 82 is located below the latch tongue 80 and bend 66 on the latch 50. The finger 82 is perpendicular to the wall 68 and parallel to the flat 44 and tongue 80. A latch finger end 84 is located at the end of the finger 82 away from the wall 68. The finger end 84 is parallel to the wall 68 and the flat 44. The latch finger 82 may be engaged by the post 64 when the post 64 moves downwardly during release of the latch 50. The post 64 normally does not need to engage the finger 82 to release the latch 50. The latch 50 will be released when the post 64 can pass under the bend 66. The finger end 84 engages the stop post 76 to prevent the latch 50 from continued angular motion due to the urging of spring 52.

A latch post slot 78 is shown on the flat 44. The slot 78 is open at the end of the flat 44 away from the base 42. The post 64 may travel vertically within the slot 78. The movement of post 64 in slot 78 guides the vertical movement of cap 28.

Referring to FIGS. 4 through 6, the operation of the latch is illustrated. In FIG. 4, the handset 12 is at rest flush within the body 14 of the telephone 10. The post 64 is in engagement with the underside of finger 80, thus keeping the handset 12 locked within the body 14.

In FIG. 5, the handset has been displaced in a downward direction. The post 64 is no longer in engagement with the underside of tongue 80. The post 64 rides on the edge of the bend 66. The spring 52 will urge the latch 50 to move in an angular direction towards the stop post 76. The bend 66 will ride over the post 64 when the bend 66 has cleared the post 64. The post 64 may then travel underneath the latch 50. The spring 62 drives cap 28, housing 72 and post 64 up under the latch 50. The latch 50 will allow the passage of the post 64 by moving axially along the dowel 56. The axial movement of the latch 50 will be impeded by the spring 52. The latch 50 will be forced, by the axial action of spring 52, back into face contact with carrier surface flat 44 after the post 64 has passed.

In FIG. 6, the handset 12 has been removed from the body 14 of the phone 10. The cap 28 is at its upper most position. The vertical upward movement of cap 28 is limited either by the spring 62 or the lip 30 and restrainer plate 38. The post 64 is now above the tongue 80.

When the handset 12 is replaced on the cap 28, the cap 28 is pressed down to lock in the latch 50. The post 64 travels down the slot 78 until it engages with the inclined surface of tongue 80. The post 64 engages the inclined surface of the tongue 80 forcing the latch 50 to move away from the post 76. The latch 50 will continue traveling away from the post 76 until the post 64 is past the tongue 80. The latch 50 is urged to move angularly toward stop 76 by spring 52. The tongue 80 will move over post 64. The post 64 will engage with the underside of tongue 80. Thus, the telephone will be locked flush within the body 14.

An alternative embodiment (not shown in the drawings) would replace the mechanical latch described above with an electrically operated latch. The release of the handset would be actuated by switch. The switch would be in communication with a solenoid. The solenoid, when latching the handset flush within the body, would normally hold the plugger of the solenoid down. Pressing the handset down would trigger the switch, which would release the plugger. The plugger, which is spring driven would pop the handset out of the recess of the body. Additionally, the switch may be actuated by the sound of the ringing phone. Thus, the sound responsive switch would eliminate the need for pressing the handset.

Furthermore, a cord (not shown) between the body 14 and the handset 12 may be employed. The cord may be external and have conventional modular connectors at the ends of the cord. The cord may be retractable and contained within the body 14 of the telephone. Additionaly, the cord may be eliminated, thus creating a "cordless" telephone.

The present invention may be embodied in other specific forms without departing from the spirit or essential attributes thereof and, accordingly, reference should be made to the appended claims, rather than to the foregoing specification, as indicating the scope of the invention.

I claim:

1. A telephone comprising: a handset, a body having a recess, the handset being flush within the body and being at rest in the recess, and latch means for releasing and raising the handset from the recess of the body when required for use, the handset being releasable from the recess when the handset is pressed down.

2. The telephone of claim 1 in which the latch means further comprises:
   a latch carrier having a slot, the latch means being disposed on the latch carrier,
   a post, the post adapted to travel in the slot and for engagement with the latch means,
   a cap, the post being disposed on a portion of the cap, the portion of the cap being in sliding engagement with the latch carrier and
   a spring, the spring being contained within the cap and in communication with the cap and the latch carrier.

3. The telephone, of claim 2 in which the latch means further comprises a latch and a dowel being carried by the latch carrier and the latch being in axial and angular pivotal engagement with the dowel.

4. The telephone of claim 3 in which the latch means further comprises a second spring being carried by the dowel and the spring urges latch movement in the angular direction and impedes latch movement in the axial direction.

5. The telephone of claim 3 in which the latch comprises a tongue being integrally fixed on the latch at the end away from the dowel.

6. The telephone of claim 3 in which the latch further comprises a finger being integrally fixed on the latch at the end away from the dowel.

7. The telephone of claim 3 in which the latch further comprises a bend being integrally fixed on the latch, angled away from the latch carrier and the angle of the bend adapted to allow the post to pass under the bend.

* * * * *